United States Patent
Hodgman et al.

(10) Patent No.: US 12,289,404 B2
(45) Date of Patent: *Apr. 29, 2025

(54) PASSWORD SIMILARITY CHECKING USING HOMOMORPHIC ENCRYPTION OPERATIONS

(71) Applicant: Rapid7, Inc., Boston, MA (US)

(72) Inventors: Roy Hodgman, Cambridge, MA (US); Vasudha Shivamoggi, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,077

(22) Filed: Feb. 27, 2024

(65) Prior Publication Data
US 2025/0062897 A1 Feb. 20, 2025

Related U.S. Application Data

(63) Continuation of application No. 17/666,824, filed on Feb. 8, 2022, now Pat. No. 11,930,108.

(51) Int. Cl.
*H04L 9/08* (2006.01)
*G06F 21/45* (2013.01)
*H04L 9/00* (2022.01)

(52) U.S. Cl.
CPC ............ *H04L 9/0863* (2013.01); *G06F 21/45* (2013.01); *H04L 9/008* (2013.01)

(58) Field of Classification Search
CPC ........ H04L 9/0863; H04L 9/008; G06F 21/45
See application file for complete search history.

(56) References Cited

U.S. PATENT DOCUMENTS

| 9,722,996 | B1* | 8/2017 | Kolman | H04L 63/083 |
|---|---|---|---|---|
| 10,826,767 | B2 | 11/2020 | Barkovic et al. | |
| 10,909,235 | B1 | 2/2021 | Farivar et al. | |
| 2009/0133120 | A1* | 5/2009 | Cannizzaro | G06F 21/46 726/18 |
| 2012/0167225 | A1* | 6/2012 | Gomez | G06F 21/46 726/26 |
| 2020/0117821 | A1 | 4/2020 | Kaul et al. | |

(Continued)

OTHER PUBLICATIONS

Password Similarity Using Probabilistic Data Structures, by Melis et al., published 2020 (Year: 2020).*

(Continued)

*Primary Examiner* — Vu V Tran
(74) *Attorney, Agent, or Firm* — Ashwin Anand

(57) ABSTRACT

Various embodiments include systems and methods to implement a password requirement conformity check. During a password reset process, a proposed password is received. A homomorphic encryption operation may be performed on the proposed password to generate a first character string. The first character string may be compared to a previous character string associated with a previous password to determine a password similarity metric. The password similarity metric may or may not satisfy at least a distance threshold. Responsive to determining that the password similarity metric does not satisfy the distance threshold, there may be a rejection of the proposed password and a prompt to receive an alternative proposed password during the password reset process.

20 Claims, 8 Drawing Sheets

(56) References Cited

U.S. PATENT DOCUMENTS

2020/0137096 A1     4/2020  Endler
2021/0117533 A1*    4/2021  Malka ................... G06F 21/31
2022/0050894 A1     2/2022  Miracolo et al.

OTHER PUBLICATIONS

Of Passwords and People: Measuring the Effect of Password-Composition Policies by Shay et al., published 2011. (Year: 2011).*

* cited by examiner

PASSWORD SIMILARITY CHECKING USING HOMOMORPHIC ENCRYPTION OPERATIONS

BACKGROUND

This application claims priority under 35 U.S.C. § 120 and is a continuation of U.S. patent application Ser. No. 17/666,824, filed Feb. 8, 2022, titled "PASSWORD REQUIREMENT CONFORMITY CHECK" the entire contents of which are incorporated herein by reference in its entirety.

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Password management systems ensure the security of passwords by making them as hard as possible for an attacker to guess. Typically, users are required to change their passwords frequently and are required to generate complex passwords that have not been re-used recently. However, even with such rules, a user may change their current password to another password that is similar to an old password. If an attacker is able to gain access to the old password, the attacker may utilize the old password to guess a current password. Accordingly, there is a need for an improved systems and methods of implementing a password requirement conformity check.

SUMMARY OF EMBODIMENTS

The systems and methods described herein may be employed in various combinations and embodiments to implement a password requirement conformity check. During a password reset process, a proposed password is received. A homomorphic encryption operation may be performed on the proposed password to generate a first character string. The first character string may be compared to a previous character string associated with a previous password to determine a password similarity metric. The password similarity metric may or may not satisfy at least a distance threshold. Responsive to determining that the password similarity metric does not satisfy the distance threshold, there may be a rejection of the proposed password and a prompt to receive an alternative proposed password during the password reset process.

Figure 1:
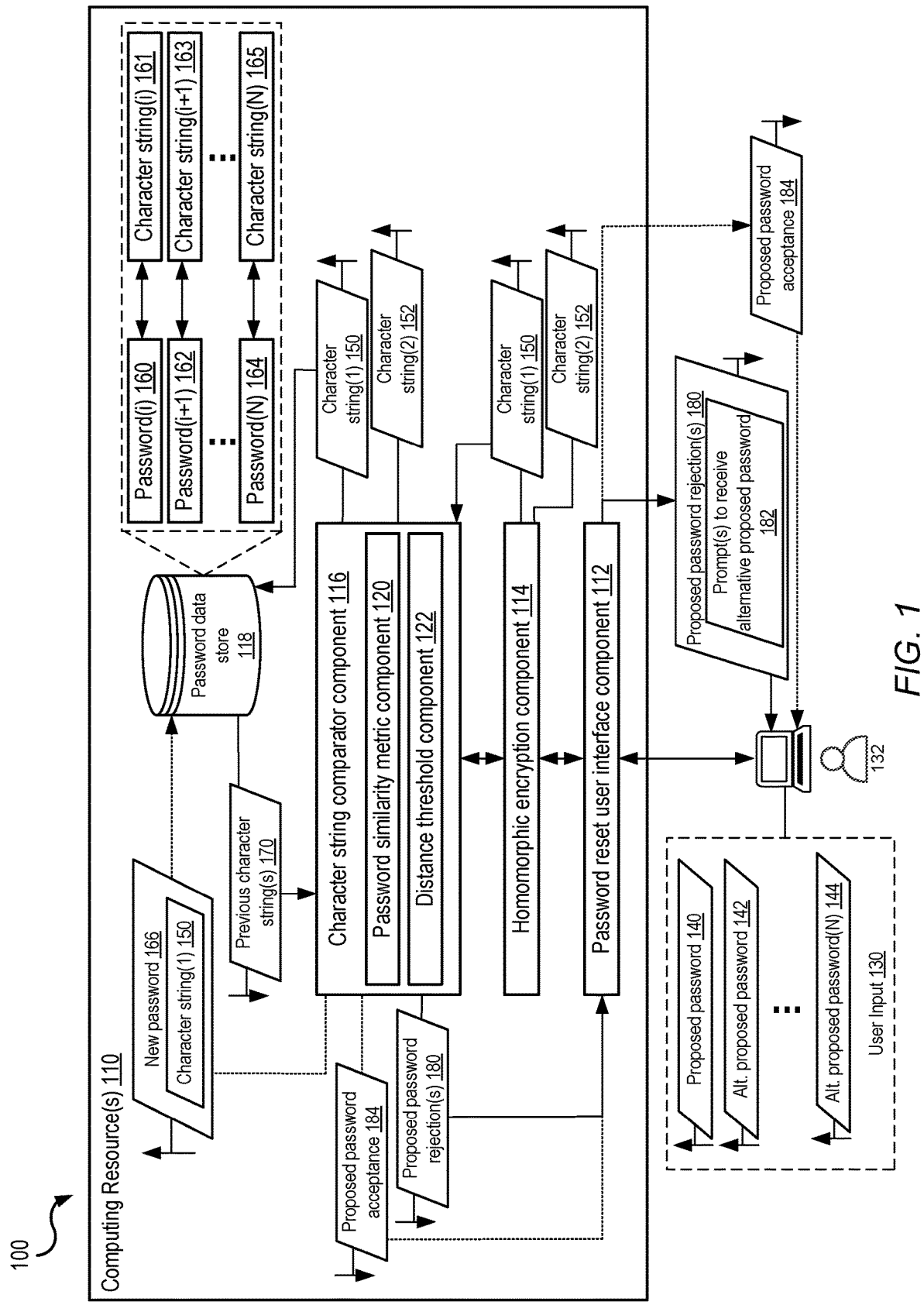
FIG. 1 is a block diagram illustrating an example system that implements a password requirement conformity check, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of implementing a password requirement conformity check. When changing a password, users will often do the least work possible to satisfy particular requirements for their new password. For example, such requirements may include not being the same as any of the previous N passwords and having a combination of uppercase, lowercase, numbers, special characters, etc. (among other possibilities). As such, it may be possible for users to make a small change to an existing password that does not afford much additional protection. An illustrative, non-limiting example is a case where a user changes their password from "Password123!" to "Password124!" which merely involves changing a single character from the old password to the new password. If an attacker is able to gain access to the old password (i.e., Password123!), the attacker may not face significant challenges when attempting to crack a current password by utilizing the old password as a starting point for guessing the current password.

The present disclosure addresses this problem by introducing an additional requirement that the new password must be sufficiently different from previous passwords. However, such a calculation is not feasible when passwords are hashed before storage, as is common practice for securing password servers. Accordingly, the password requirement conformity check system described in the present disclosure utilizes homomorphic encryption, which allows for the measurement of an edit distance between two encrypted passwords without revealing the passwords themselves. As used herein, the terms "edit distance" (e.g., a "Levenshtein distance", as an illustrative, non-limiting example) and "password similarity metric" are used to refer to a minimum number of edit operations required to transform one character string ($1) into another character string ($s_2$). To illustrate, the edit operations allowed for this purpose may include: (i) inserting a character string into a string; (ii) deleting a character from a string; and (iii) replacing a character of a string with another character. As illustrative, non-limiting examples, an edit distance between the character strings "Password123!" and Password124!" is one (1), while an edit distance between the character strings "dog" and "cat" is three (3).

The password requirement conformity check process of the present disclosure provides a secure way to evaluate a new password for similarity to previous passwords as well as complexity and recency. Thus, the systems and methods of the present disclosure may enable a robust evaluation of passwords that includes examining a similarity to previous passwords. The systems and methods of the present disclosure implement a novel metric to enable such a password similarity examination while also ensuring that information about the old passwords is not revealed to an attacker.

With regard to conventional approaches to password requirements, network account management systems ensure that passwords are secure by making them as difficult as possible for an attacker to figure out. This is accomplished in several ways. For example, as an attacker may be able to guess a password that is a common phrase, users are typically required to choose complex passwords. Complex passwords of sufficient length and character diversity are difficult to guess in a brute force fashion that is computationally feasible within a reasonable amount of time and for a reasonable cost. As used herein, the terms "complex" and "complexity" refer to this sufficiency of length and character diversity in a password, such as a proposed password having a combination of uppercase, lowercase, numbers, special characters, etc. (among other possibilities). As another example, as an attacker may obtain access to a database of existing passwords, users are typically required to change their passwords frequently. Requiring users to change passwords on a regular cadence (e.g., every 90 days, etc.) limits the lifetime of a potentially compromised password. As used herein, the terms "frequent" and "frequency" refer to this regular cadence for changing a password. As a further example, an attacker may utilize an old database of passwords to guess future passwords. Accordingly, users may not be allowed to extend the lifetime of a potentially compromised password by re-using the password too quickly. As used herein, the terms "recent" and "recency" refer to this limited re-usability of previous passwords, such as a proposed password not being the same as any of the previous N passwords.

While the above-described password requirements may result in safer passwords, such conventional approaches retain the risk of allowing passwords that are very similar to a previously compromised password. As an illustrative, non-limiting example, suppose that a user has a password that meets the complexity requirements (e.g., "Password123!") that becomes compromised when someone observes the user entering the password. On the next occasion that the user is required by the network account management system to change their current password to a new password, the user could make a relatively minor change to the compromised password (e.g., "Password124!", etc.). The new password may meet all the above-described password requirements, including having sufficient complexity and representing a newly changed password that has not been used before. However, an attacker that has access to the compromised password may be able to easily guess the new password.

A potential solution to the above-described problem may be to add a new rule that involves computing an "edit distance" between the current password and a proposed password and only accepting the proposed password if the edit distance satisfies a threshold value. Unfortunately, such an approach is incompatible with another safety mechanism of conventional password management systems, namely the hashing of passwords before their storage.

As password management systems should not become a source of information to attackers who gain unauthorized access, such systems typically provide additional protection for passwords. For example, such systems may transform the passwords in a manner that does not reveal any information about the original password (i.e., a "plaintext" password) and that still enables enforcement of complexity and recency requirements. Such transformations are typically done with a cryptographic hash, which is a one-way mathematical operation that is computationally difficult to reverse (i.e., to convert the output of the hash operation back into the plaintext password).

Comparing outputs of the hash operation to determine if such outputs are identical is equivalent to comparing the original, plaintext passwords. That is, it is possible to determine whether a given password satisfies a recency requirement based on a comparison of stored outputs of previous hash operations. However, it is not possible to determine whether a given password satisfies a "similarity" requirement based on a comparison of stored outputs of previous hash operations, as one property of a cryptographic hash operation is that distances are not preserved in the outputs. For example, application of a cryptographic hash operation to two similar plaintext inputs (e.g., "Table" and "Tables") results in significantly different outputs. This property of cryptographic hashing makes it significantly more difficult for the outputs to "leak" information about the associated plaintext inputs, thereby providing additional security. However, this property of cryptographic hashing also prevents the use of hashed passwords as inputs for a distance calculation for testing of a "similarity" requirement. The systems and methods of the present disclosure represent an approach that can balance both security requirements.

In the present disclosure, instead of hashing a password before storage on an authentication server, the password is encrypted using homomorphic encryption to enable computation of an edit distance between two strings without having to disclose the original, unencrypted input values (as described in "Privacy Preserving String Comparisons Based on Levenshtein Distance," by Rane, S.; Sun, W., December 2010, the contents of which are incorporated by reference in its entirety). As such, utilizing homomorphic encryption according to the present disclosure not only makes it significantly more difficult for the outputs to "leak" information about the associated plaintext inputs but also enables a determination of a "similarity metric" between two passwords based on the computed edit distance.

The present disclosure implements a password requirement conformity check that is designed to determine whether a previous password and a proposed password are considered to be "too similar" and are to be rejected for failure to satisfy a password "similarity" requirement. According to some embodiments, the systems and methods of the present disclosure may initially determine whether a proposed password satisfies particular "complexity" requirements. For example, the "complexity" requirements may correspond to the proposed password having sufficient length and character diversity (e.g., having a combination of uppercase, lowercase, numbers, special characters, etc.). If the proposed password satisfies the "complexity" requirements, the systems and methods of the present disclosure may then determine whether the proposed password satisfies particular "recency" requirements, such as whether the proposed password has been used as any of the previous N passwords. If the proposed password satisfies the "recency" requirements, the systems and methods of the present disclosure may then determine whether the proposed password satisfies particular "similarity" requirements, such as whether the proposed password has a password similarity metric satisfying a distance threshold (e.g., having an edit distance that is at least M edit steps away from a previous password).

It should be noted that, with the systems and methods of the present disclosure, there may be various security issues to consider. As with any mitigation procedure, there are benefits which are weighed against any potential new risks. With the systems and methods of the present disclosure, the inventors have identified three areas to consider.

A first area of consideration is that there may be an added burden of securing the encrypted password system of the present disclosure. If an attacker is able to gain access to the key to decrypt the storage system, then the attacker could potentially access the full set of passwords in their original, plaintext form. Therefore, the inventors recognize the importance of storing the encryption key separately as well as the importance of continuously securing the encryption key.

A second area of consideration is that there may be an extra constraint on the user. It may be counterproductive if the password requirement became so onerous that users started writing down their passwords in order to remember them. To protect against that, an administrator may tune the distance threshold to be lower, allowing for passwords that are slightly similar but not "too close" to the previous passwords.

A third area of consideration is that the password requirement conformity check system of the present disclosure may have the potential to "leak" information during a password reset process related to similarity of a proposed password to one or more previous passwords. A determined attacker could potentially take advantage of the password reset process to iterate small changes and identify an actual password. As such, the inventors recognize that this security consideration may be mitigated by providing a minimal amount of information during the password reset process, either about a given calculated distance or a given stored password.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements password requirement conformity check, in accordance with some embodiments. In FIG. 1, utilization of homomorphic encryption by the system 100 may enable a robust evaluation of passwords, including an examination of a similarity to previous passwords.

The example system 100 depicted in FIG. 1 may be utilized to implement a password requirement conformity check that is designed to determine whether a previous password and a proposed password are considered to be "too similar" and are to be rejected for failure to satisfy a password "similarity" requirement. According to some embodiments, the systems and methods of the present disclosure may initially determine whether a proposed password satisfies particular "complexity" requirements (e.g., having sufficient length, character diversity, etc.). If the proposed password satisfies the "complexity" requirements, the systems and methods of the present disclosure may then determine whether the proposed password satisfies particular "recency" requirements, such as whether the proposed password has been used as any of the previous N passwords. If the proposed password satisfies the "recency" requirements, the systems and methods of the present disclosure may then determine whether the proposed password satisfies particular "similarity" requirements, such as whether the proposed password is at least M edit steps away from the N previous passwords.

FIG. 1 depicts one or more computing resources 110, which may include one or more hardware processors with associated memory (not shown, see e.g., FIG. 7). The computing resource(s) 110 may be configured to implement a password requirement conformity check.

According to various embodiments, FIG. 1 illustrates that the computing resource(s) 110 may include at least: a password reset user interface component 112; a homomorphic encryption component 114; a character string comparator component 116; and a password data store 118. FIG. 1 further illustrates that the character string comparator component 116 may include various sub-components, including a password similarity metric component 120 and a distance threshold component 122.

According to various embodiments, the password reset user interface component 112 may be configured to receive, as part of user input 130 from a user 132, a proposed password 140 during a password reset process. The proposed password 140 may correspond to a first proposed password received from the user 132 during the password reset process. As described herein, the password reset user interface component 112 may be configured to receive, as part of user input 130 from the user 132, one or more alternative proposed passwords during the password reset process, in cases where a particular proposed password fails the password conformity check. To illustrate, the password reset user interface component 112 may receive an alternative proposed password 142, which may correspond to a first alternative proposed password received from the user 132 during the password reset process. FIG. 1 further illustrates that the password reset user interface component 112 may be configured to receive, as part of user input 130 from the user 132, one or more subsequent alternative proposed passwords, in cases where the alternative proposed password 142 fails the password conformity check. To illustrate, in cases where a particular alternative proposed password (e.g., the alternative proposed password 142) fails the password conformity check, the password reset user interface component 112 may receive one or more additional alternative proposed passwords, up to an Nth alternative proposed password 144 (identified as "Alt. proposed password (N)" in FIG. 1) during the password reset process.

According to various embodiments, the homomorphic encryption component 114 may be configured to perform a homomorphic encryption operation on a particular proposed password received during the password reset process (e.g., the proposed password 140) to generate a character string for the particular proposed password, such as a first character string 150 (identified as "Character string(1)" in FIG. 1) associated with the proposed password 140.

FIG. 1 illustrates that, according to some embodiments, the password data store 118 may be accessible to the character string comparator component 116 and may be configured to store one or more passwords (e.g., previous passwords associated with the user 132), each of which may be associated with its own character string (e.g., character strings previously generated by the homomorphic encryption component 114). For example, the password(s) may include at least a previous password 160 (identified as "Password(i)" in FIG. 1) associated with a previous character string 161 (identified as "Character string(i)" in FIG. 1), where the previous password 160 corresponds to a most recent password of the user 132 that is to be reset during the password reset process. As another example, the password(s) may include other previous passwords, including: a second previous password 162 (identified as "Password(i+1)" in FIG. 1) associated with a second previous character string 163 (identified as "Character string(i+1)" in FIG. 1); and one or more other previous passwords, up to an Nth previous password 164 (identified as "Password (N)" in FIG. 1) associated with an Nth previous character string 165 (identified as "Character string (N)" in FIG. 1).

According to various embodiments, the password similarity metric component 120 of the character string comparator component 116 may be configured to compare a particular character string generated by the homomorphic encryption component 114 to at least one previous character string 170 stored at the password data store 118 to determine at least one password similarity metric. For example, the password similarity metric component 120 may be configured to compare the previous character string 161 retrieved from the password data store 118 to the first character string 150 associated with the proposed password 140 to determine a password similarity metric. The distance threshold component 122 of the character string comparator component 116 may be configured to determine whether the password similarity metric satisfies at least a distance threshold, as described further herein with respect to FIGS. 2 and 3A-3C.

According to some embodiments, the password similarity metric may correspond to an edit distance between the first character string 150 and the previous character string(s) 170, where the edit distance represents a calculated minimum number of edit operations required to transform the first character string 150 into the previous characters string(s) 170. The distance threshold may correspond to a threshold number of edit operations. Determining whether the password similarity metric satisfies the distance threshold may include comparing the calculated minimum number of edit operations to the threshold number of edit operations. As an illustrative, non-limiting example, the threshold number of edit operations corresponds to not less than two edit operations. As an illustrative, non-limiting example, the threshold number of edit operations corresponds to not more than ten edit operations. According to some embodiments, the threshold number of edits operations may be more than ten edit operations.

According to various embodiments, FIG. 1 illustrates that the character string comparator component 116 may be configured to reject the proposed password 140 responsive to determining that the password similarity metric does not satisfy the distance threshold. According to various embodiments, responsive to determining that the password similarity metric does not satisfy the distance threshold, the character string comparator component 116 may be configured to generate at least one proposed password rejection 180. According to some embodiments, FIG. 1 illustrates that the character string comparator component 116 may be configured to send the proposed password rejection 180 to the password reset user interface component 112. The password reset user interface component 112 may be configured to provide the proposed password rejection 180 to the user 132, where the proposed password rejection 180 includes at least one prompt 182 to receive an alternative proposed password during the password reset process.

According to some embodiments, FIG. 1 illustrates (via dashed lines) that the character string comparator component 116 may be configured to accept the proposed password 140 responsive to determining that the password similarity metric satisfies the distance threshold. According to some embodiments, responsive to determining that the password similarity metric satisfies the distance threshold, the character string comparator component 116 may be configured to generate at least one proposed password acceptance 184. According to some embodiments, FIG. 1 illustrates that the character string comparator component 116 may be configured to send the proposed password acceptance 184 to the password reset user interface component 112. The password reset user interface component 112 may be configured to provide the proposed password acceptance 184 to the user 132. According to some embodiments, FIG. 1 illustrates that the character string comparator component 116 may be configured to store, at the password data store 118, the first character string 150 associated with the proposed password 140 as a new password 166, responsive to determining that the password similarity metric satisfies the distance threshold.

Figure 4:
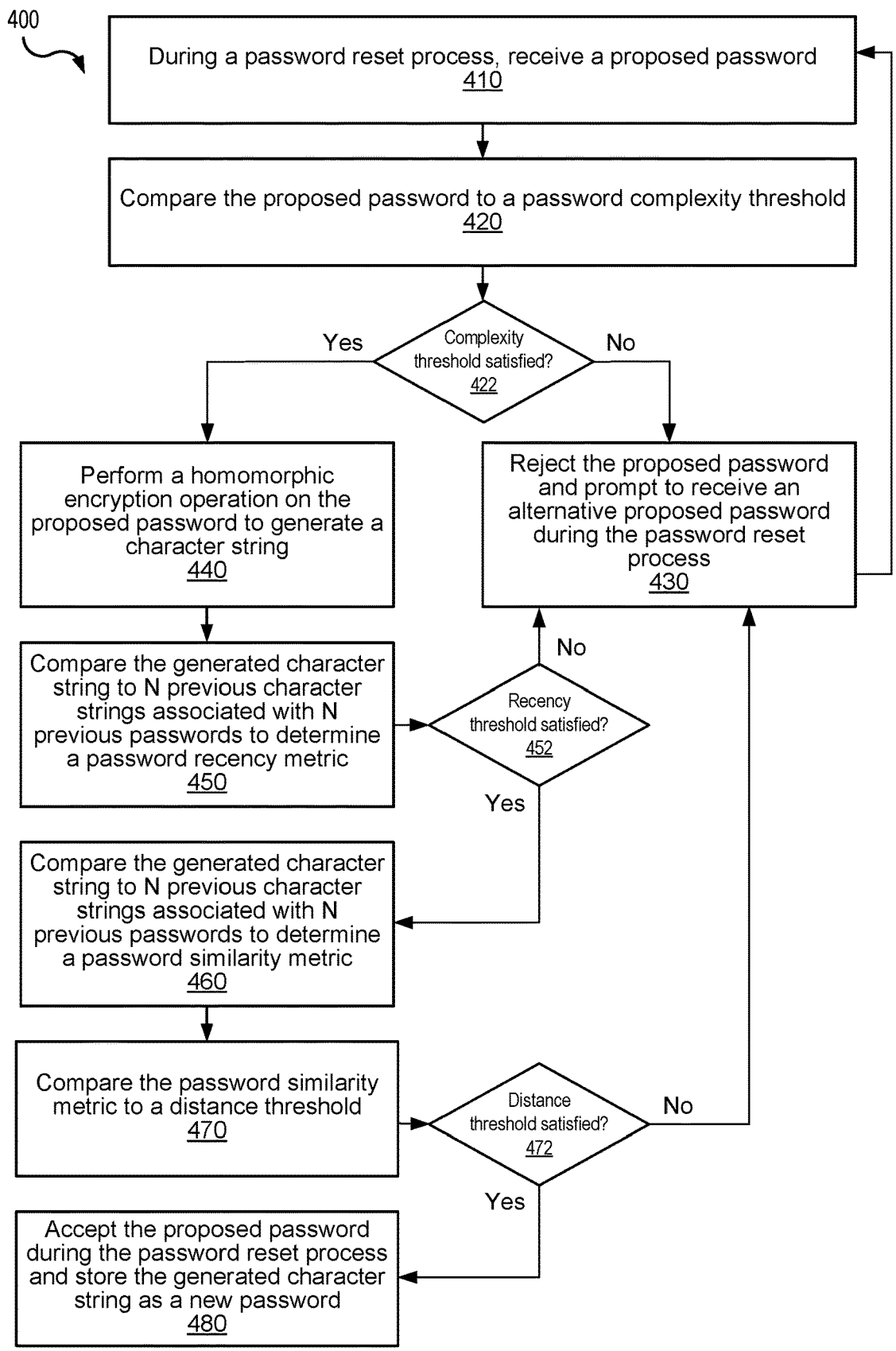
FIG. 4 is a flowchart that illustrates an example of a password requirement conformity check process, according to some embodiments.

As described further herein with respect to FIG. 4, in some embodiments, the system 100 of FIG. 1 may be further configured to examine a password complexity threshold and/or a password recency threshold, in addition to the distance threshold (corresponding to a similarity of the proposed password 140 to one or more previous passwords, as described herein). The password complexity threshold may correspond to a threshold related to sufficiency of length and character diversity in the proposed password 140. The password recency threshold may correspond to a threshold related to limited re-usability of previous passwords.

For example, the password reset user interface component 112 may be configured to compare the proposed password 140 to a password complexity threshold, according to some embodiments. The password reset user interface component 112 may be configured to reject the proposed password 140 for failure to satisfy the password complexity threshold. In some cases, the password reset user interface component 112 may be configured to generate the proposed password rejection(s) 180 which may include the prompt(s) 182 (presented to the user 132) to receive an alternative proposed password during the password reset process.

According to some embodiments, the character string comparator component 116 may be configured to compare a character string generated by the homomorphic encryption component 114 (e.g., the first character string 150) to N previous character strings associated with N previous passwords to determine a password recency metric. For example, the character string comparator component 116 may be configured to query the password data store 118 for the previous character string(s) 170 associated with the user 132. FIG. 1 illustrates that, according to some embodiments, the password data store 118 may store multiple previous passwords (associated with the user 132), each of which may be associated with its own character string (e.g., character strings previously generated by the homomorphic encryption component 114). For example, the passwords may include: the previous password 160 associated with the previous character string 161; the second previous password 162 associated with the second previous character string 163; and one or more other previous passwords, up to the Nth previous password 164 associated with the Nth previous character string 165. The password similarity metric component 120 of the character string comparator component 116 may compare the first character string 150 to each of the previous character string(s) 170 (e.g., the N character strings 161, 163, 165 associated with the N previous passwords 160, 162, 164) to determine the password recency metric.

According to some embodiments, responsive to determining that the password recency metric (associated with the proposed password 140) does not satisfy the recency threshold, the character string comparator component 116 may be configured to reject the proposed password 140 for failure to satisfy the recency threshold. In some cases, the character string comparator component 116 may be configured to generate the proposed password rejection(s) 180 which may include the prompt(s) 182 (presented to the user 132) to receive an alternative proposed password during the password reset process. The proposed password rejection(s) 180 may be communicated from the character string comparator component 116 to the password reset user interface component 112. FIG. 1 illustrates that the proposed password rejection(s) 180 presented to the user 132 via the password reset user interface component 112 may include the prompt(s) 182 to receive an alternative proposed password during the password reset process.

Thus, the system 100 of FIG. 1 represents an example of a system that implements a password requirement conformity check, according to various embodiments of the present disclosure. By utilizing homomorphic encryption, the system 100 of FIG. 1 may enable a robust evaluation of passwords, including an examination of a similarity to previous passwords, as described herein.

Figure 2:
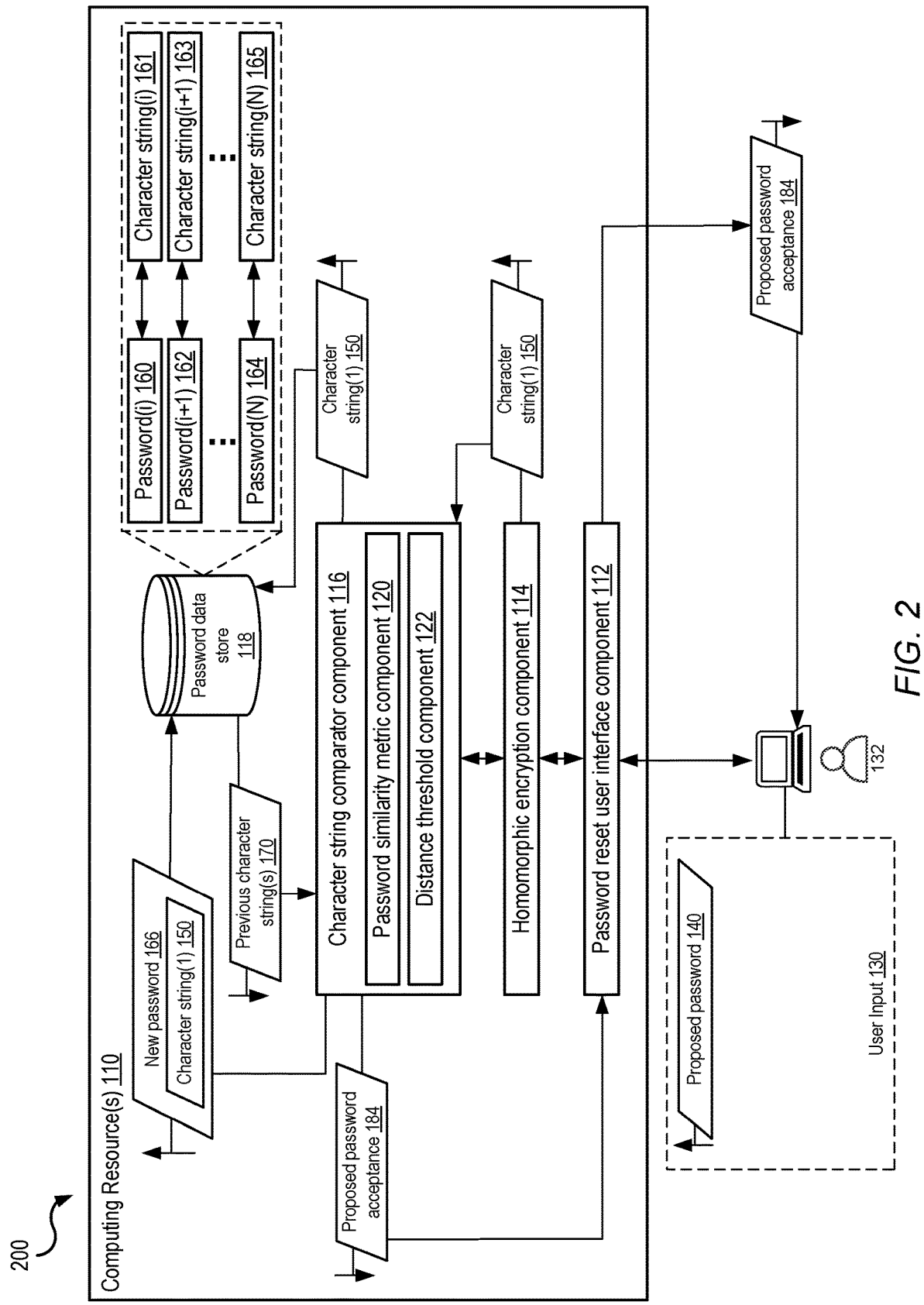
FIG. 2 is a block diagram illustrating an example of a process in which a proposed password is accepted by the password requirement conformity check system, in accordance with some embodiments.

FIG. 2 is a block diagram 200 that illustrates an example of a process in which a proposed password is accepted by the password requirement conformity check system, in accordance with some embodiments.

FIG. 2 illustrates that the password reset user interface component 112 may be configured to receive, as part of the user input 130 from the user 132, the proposed password 140 during the password reset process. The proposed password 140 may correspond to a first proposed password received from the user 132 during the password reset process. The homomorphic encryption component 114 may be configured to perform a homomorphic encryption operation on the proposed password 140 to generate the first character string 150 associated with the proposed password 140.

The password similarity metric component 120 of the character string comparator component 116 may be configured to compare the first character string 150 generated by the homomorphic encryption component 114 to at least one previous character string 170 stored at the password data store 118 to determine at least one password similarity metric. For example, the password similarity metric component 120 may be configured to compare the previous character string 161 retrieved from the password data store 118 to the first character string 150 associated with the proposed password 140 to determine a password similarity metric. The distance threshold component 122 of the character string comparator component 116 may be configured to determine whether the password similarity metric satisfies at least a distance threshold.

According to some embodiments, the password similarity metric may correspond to an edit distance between the first character string 150 and the previous character string(s) 170, where the edit distance represents a calculated minimum number of edit operations required to transform the first character string 150 into the previous characters string(s) 170. The distance threshold may correspond to a threshold number of edit operations. Determining whether the password similarity metric satisfies the distance threshold may include comparing the calculated minimum number of edit operations to the threshold number of edit operations.

FIG. 2 illustrates that the character string comparator component 116 may be configured to accept the proposed password 140 responsive to determining that the password similarity metric satisfies the distance threshold. According to some embodiments, responsive to determining that the password similarity metric satisfies the distance threshold, the character string comparator component 116 may be configured to generate the proposed password acceptance 184. According to some embodiments, FIG. 2 illustrates that the character string comparator component 116 may be configured to send the proposed password acceptance 184 to the password reset user interface component 112. The password reset user interface component 112 may be configured to provide the proposed password acceptance 184 to the user 132. According to some embodiments, FIG. 2 illustrates that the character string comparator component 116 may be configured to store, at the password data store 118, the first character string 150 associated with the proposed password 140 as the new password 166, responsive to determining that the password similarity metric satisfies the distance threshold.

Thus, FIG. 2 illustrates an example process in which the proposed password 140 is accepted by the password requirement conformity check system.

Figure 3A:
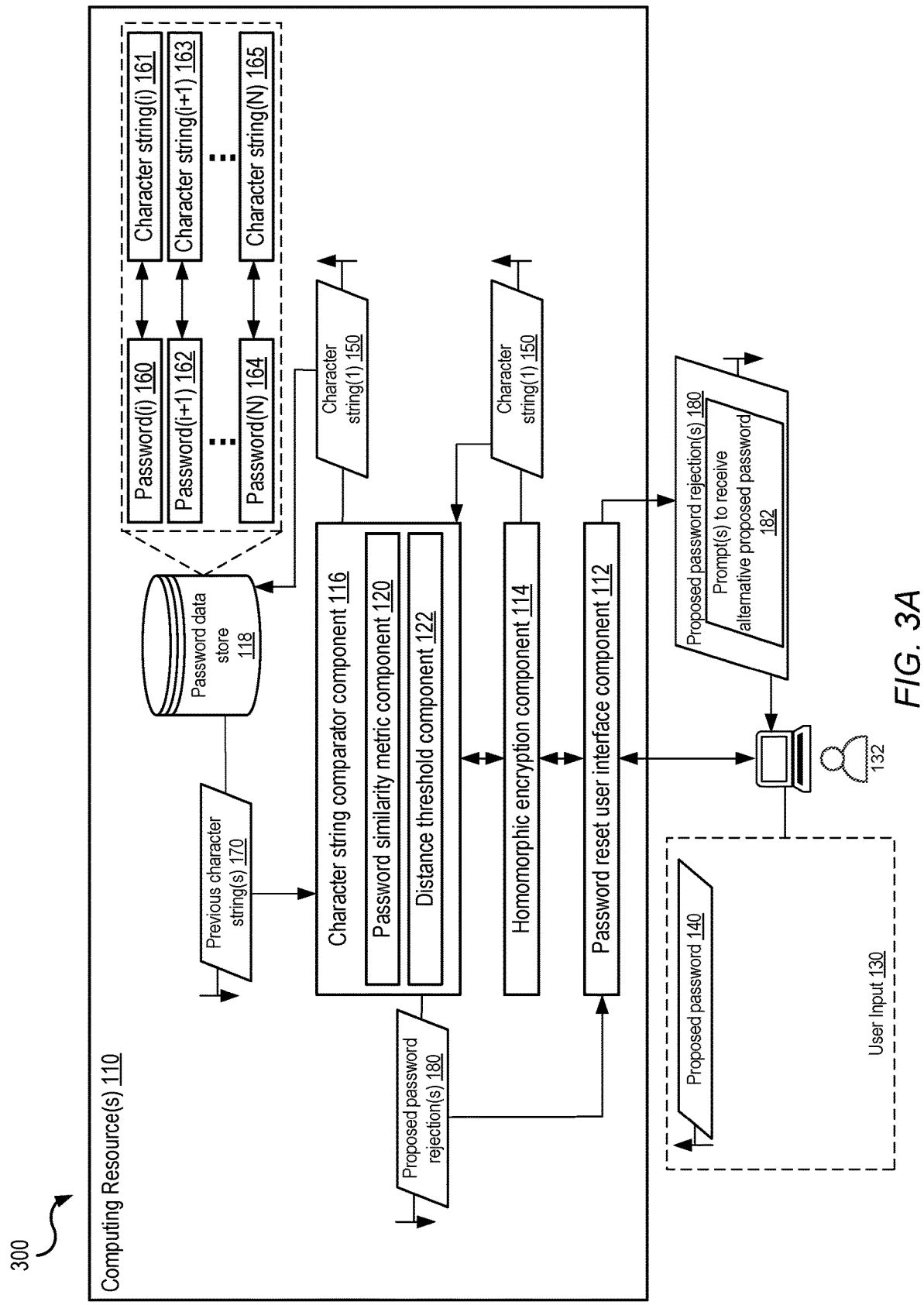
FIG. 3A is a block diagram illustrating an example of a process in which a proposed password is rejected by the password requirement conformity check system, in accordance with some embodiments.

FIG. 3A is a block diagram 300 illustrating an example of a process in which a proposed password is rejected by the password requirement conformity check system, in accordance with some embodiments.

FIG. 3A illustrates that the password reset user interface component 112 may be configured to receive, as part of the user input 130 from the user 132, the proposed password 140 during the password reset process. The proposed password 140 may correspond to a first proposed password received from the user 132 during the password reset process. The homomorphic encryption component 114 may be configured to perform a homomorphic encryption operation on the proposed password 140 to generate the first character string 150 associated with the proposed password 140.

The password similarity metric component 120 of the character string comparator component 116 may be configured to compare the first character string 150 generated by the homomorphic encryption component 114 to at least one previous character string 170 stored at the password data store 118 to determine at least one password similarity metric. For example, the password similarity metric component 120 may be configured to compare the previous character string 161 retrieved from the password data store 118 to the first character string 150 associated with the proposed password 140 to determine a password similarity metric. The distance threshold component 122 of the character string comparator component 116 may be configured to determine whether the password similarity metric satisfies at least a distance threshold.

According to some embodiments, the password similarity metric may correspond to an edit distance between the first character string 150 and the previous character string(s) 170, where the edit distance represents a calculated minimum number of edit operations required to transform the first character string 150 into the previous characters string(s) 170. The distance threshold may correspond to a threshold number of edit operations. Determining whether the password similarity metric satisfies the distance threshold may include comparing the calculated minimum number of edit operations to the threshold number of edit operations.

FIG. 3A illustrates that the character string comparator component 116 may be configured to reject the proposed password 140 responsive to determining that the password similarity metric does not satisfy the distance threshold. According to some embodiments, responsive to determining that the password similarity metric does not satisfy the distance threshold, the character string comparator component 116 may be configured to generate at least one proposed password rejection 180. According to some embodiments, FIG. 3A illustrates that the character string comparator component 116 may be configured to send the proposed password rejection 180 to the password reset user interface component 112. The password reset user interface component 112 may be configured to provide the proposed password rejection 180 to the user 132, where the proposed password rejection 180 includes at least one prompt 182 to receive an alternative proposed password during the password reset process.

Figure 3B:
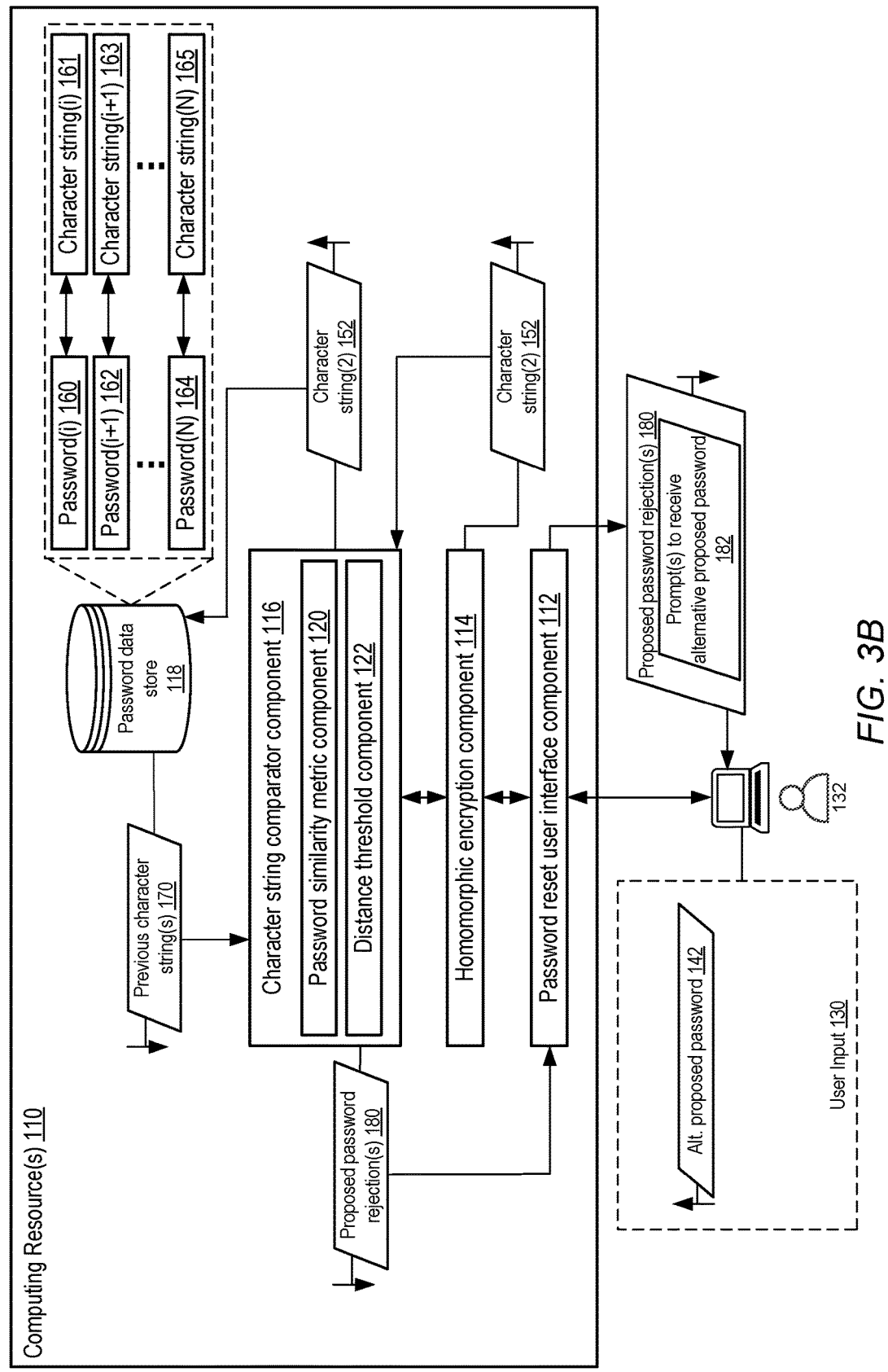
FIG. 3B is a block diagram illustrating an example of a process in which an alternative proposed password is rejected by the password requirement conformity check system, in accordance with some embodiments.
Figure 3C:
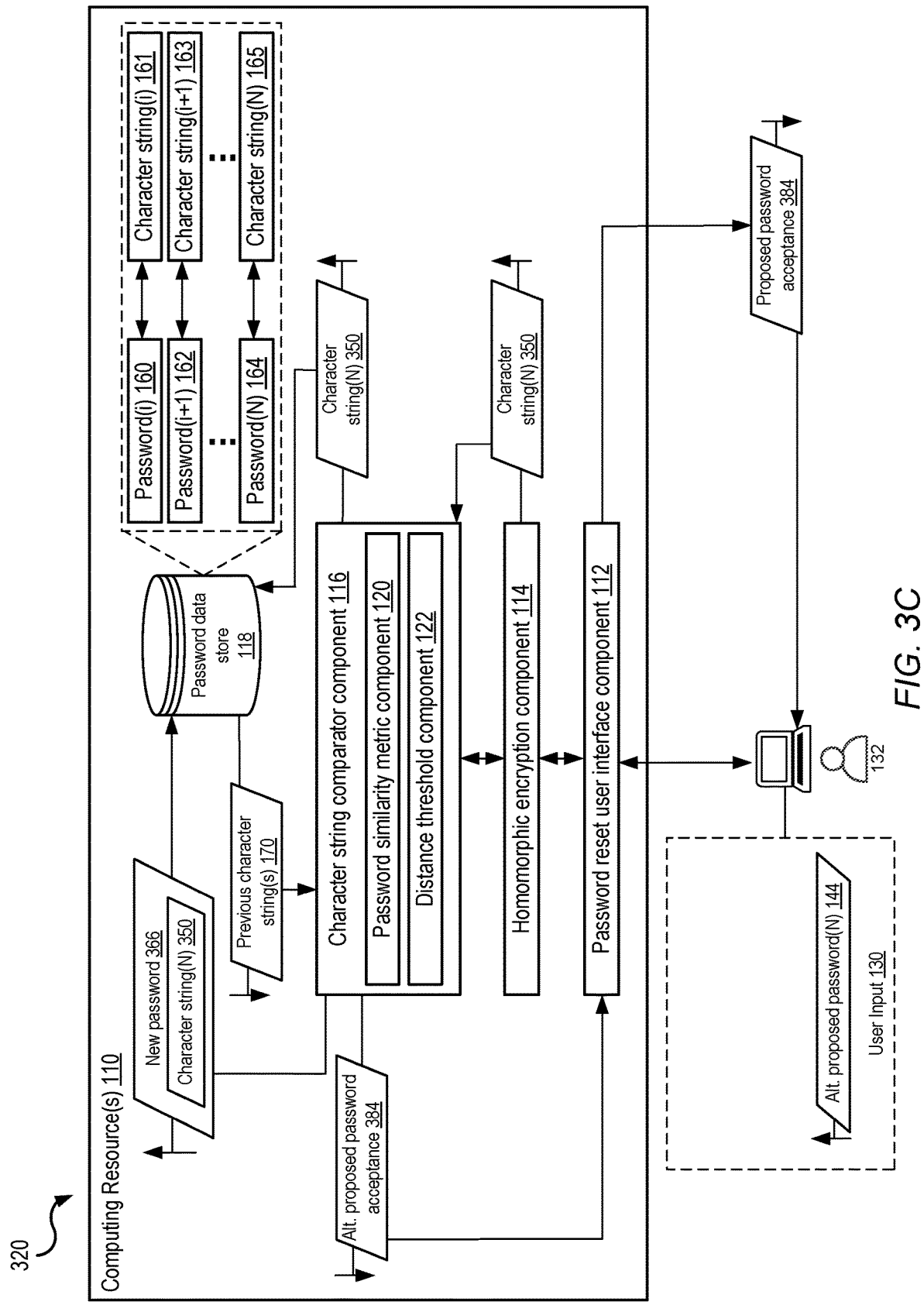
FIG. 3C is a block diagram illustrating an example of a process in which an alternative proposed password is accepted by the password requirement conformity check system, in accordance with some embodiments.

Thus, FIG. 3A illustrates an example of a process in which the proposed password 140 is rejected by the password requirement conformity check system. FIGS. 3B and 3C illustrate scenarios in which alternative passwords provided by the user 132 are either rejected or accepted by the password requirement conformity check system, respectively.

FIG. 3B is a block diagram 310 illustrating an example of a process in which an alternative proposed password is rejected by the password requirement conformity check system, in accordance with some embodiments.

FIG. 3B illustrates that the password reset user interface component 112 may be configured to receive, as part of the user input 130 from the user 132, the alternative proposed password 142 during the password reset process. The alternative proposed password 142 may correspond to a next proposed password (following the proposed password 140 depicted in FIG. 3A) received from the user 132 during the password reset process. The homomorphic encryption component 114 may be configured to perform a homomorphic encryption operation on the alternative proposed password 142 to generate the second character string 152 associated with the alternative proposed password 142.

The password similarity metric component 120 of the character string comparator component 116 may be configured to compare the second character string 152 generated by the homomorphic encryption component 114 to at least one previous character string 170 stored at the password data store 118 to determine at least one password similarity metric. For example, the password similarity metric component 120 may be configured to compare the previous character string 161 retrieved from the password data store 118 to the second character string 152 associated with the alternative proposed password 142 to determine a password similarity metric. The distance threshold component 122 of the character string comparator component 116 may be configured to determine whether the password similarity metric satisfies at least a distance threshold.

According to some embodiments, the password similarity metric may correspond to an edit distance between the second character string 152 and the previous character string(s) 170, where the edit distance represents a calculated minimum number of edit operations required to transform the second character string 152 into the previous characters string(s) 170. The distance threshold may correspond to a threshold number of edit operations. Determining whether the password similarity metric satisfies the distance threshold may include comparing the calculated minimum number of edit operations to the threshold number of edit operations.

FIG. 3B illustrates that the character string comparator component 116 may be configured to reject the alternative proposed password 142 responsive to determining that the password similarity metric does not satisfy the distance threshold. According to some embodiments, responsive to determining that the password similarity metric does not satisfy the distance threshold, the character string comparator component 116 may be configured to generate at least one proposed password rejection 180. According to some embodiments, FIG. 3B illustrates that the character string comparator component 116 may be configured to send the proposed password rejection 180 to the password reset user interface component 112. The password reset user interface component 112 may be configured to provide the proposed password rejection 180 to the user 132, where the proposed password rejection 180 includes at least one prompt 182 to receive another alternative proposed password during the password reset process.

Thus, FIG. 3B illustrates an example of a process in which an alternative proposed password is rejected by the password requirement conformity check system.

FIG. 3C is a block diagram 320 that illustrates an example of a process in which an alternative proposed password is accepted by the password requirement conformity check system, in accordance with some embodiments.

FIG. 3C illustrates that the password reset user interface component 112 may be configured to receive, as part of the user input 130 from the user 132, the Nth alternative proposed password 144 during the password reset process. The Nth alternative proposed password 144 may correspond to another alternative proposed password (following the alternative password 142 of FIG. 3B) received from the user 132 during the password reset process. The homomorphic encryption component 114 may be configured to perform a homomorphic encryption operation on the Nth alternative proposed password 144 to generate an Nth character string 350 associated with the Nth alternative proposed password 144.

The password similarity metric component 120 of the character string comparator component 116 may be configured to compare the Nth character string 350 generated by the homomorphic encryption component 114 to at least one previous character string 170 stored at the password data store 118 to determine at least one password similarity metric. For example, the password similarity metric component 120 may be configured to compare the previous character string 161 retrieved from the password data store 118 to the Nth character string 350 associated with the Nth alternative proposed password 144 to determine a password similarity metric. The distance threshold component 122 of the character string comparator component 116 may be configured to determine whether the password similarity metric satisfies at least a distance threshold.

According to some embodiments, the password similarity metric may correspond to an edit distance between the Nth character string 350 and the previous character string(s) 170, where the edit distance represents a calculated minimum number of edit operations required to transform the Nth character string 350 into the previous characters string(s) 170. The distance threshold may correspond to a threshold number of edit operations. Determining whether the password similarity metric satisfies the distance threshold may include comparing the calculated minimum number of edit operations to the threshold number of edit operations.

FIG. 3C illustrates that the character string comparator component 116 may be configured to accept the Nth alternative proposed password 144 responsive to determining that the password similarity metric satisfies the distance threshold. According to some embodiments, responsive to determining that the password similarity metric satisfies the distance threshold, the character string comparator component 116 may be configured to generate an alternative proposed password acceptance 384. According to some embodiments, FIG. 3C illustrates that the character string comparator component 116 may be configured to send the proposed password acceptance 184 to the password reset user interface component 112. The password reset user interface component 112 may be configured to provide the alternative proposed password acceptance 384 to the user 132. According to some embodiments, FIG. 3C illustrates that the character string comparator component 116 may be configured to store, at the password data store 118, the Nth character string 350 associated with the Nth alternative proposed password 144 as a new password 366, responsive to determining that the password similarity metric satisfies the distance threshold.

Thus, FIG. 3C illustrates an example process in which an alternative proposed password is accepted by the password requirement conformity check system.

FIG. 4 is a flowchart 400 that illustrates an example of a password requirement conformity check process, according to some embodiments. In FIG. 4, one or more hardware processors may be utilized to implement the password requirement conformity check process.

At operation 410, the process includes receiving a proposed password during a password reset process. For example, referring to FIG. 1, the password reset user interface component 112 may receive the proposed password 140 (from the user 132) during a password reset process.

At operation 420, the process includes comparing the proposed password to a password complexity threshold. For example, referring to FIG. 1, the password reset user interface component 112 may be configured to examine a password complexity threshold associated with the proposed password 140. The password complexity threshold may correspond to a threshold related to sufficiency of length and character diversity in the proposed password 140.

At operation 422, the process includes determining whether the proposed password satisfies the password complexity threshold. Responsive to determining that the proposed password does not satisfy the password complexity threshold, the process may proceed to operation 430. Responsive to determining that the proposed password satisfies the password complexity threshold, the process may proceed to operation 440.

At operation 430, the process includes rejecting the proposed password and prompting to receive an alternative proposed password during the password reset process. For example, referring to FIG. 1, the password reset user interface component 112 may be configured to reject the proposed password 140 for failure to satisfy the password complexity threshold. In some cases, the password reset user interface component 112 may be configured to generate the proposed password rejection(s) 180 which may include the prompt(s) 182 (presented to the user 132) to receive an alternative proposed password during the password reset process. FIG. 4 illustrates that the process may return to operation 410.

At operation 440, the process includes performing a homomorphic encryption operation on the proposed password to generate a character string. For example, referring to FIG. 1, the homomorphic encryption component 114 may perform a homomorphic encryption operation on the proposed password 140 to generate the first character string 150.

At operation 450, the process includes comparing the generated character string to N previous character strings associated with N previous passwords to determine a password recency metric. For example, referring to FIG. 1, the character string comparator component 116 may query the password data store 118 for the previous character string(s) 170 associated with the user 132. FIG. 1 illustrates that, according to some embodiments, the password data store 118 may store multiple previous passwords (associated with the user 132), each of which may be associated with its own character string (e.g., character strings previously generated by the homomorphic encryption component 114). For example, the passwords may include: the previous password 160 associated with the previous character string 161; the second previous password 162 associated with the second previous character string 163; and one or more other previous passwords, up to the Nth previous password 164 associated with the Nth previous character string 165. The password similarity metric component 120 of the character string comparator component 116 may compare the first character string 150 to each of the previous character string(s) 170 (e.g., the N character strings 161, 163, 165 associated with the N previous passwords 160, 162, 164) to determine a password recency metric.

At operation 452, the process includes determining whether the password recency metric (associated with the proposed password) satisfies a recency threshold. For example, referring to FIG. 1, the password reset user interface component 112 may be configured to examine a password recency threshold associated with the proposed password 140. The password recency threshold may correspond to a threshold related to limited re-usability of previous passwords.

Responsive to determining that the password recency metric (associated with the proposed password) does not satisfy the recency threshold, the process may proceed to operation 430. Responsive to determining that the password recency metric (associated with the proposed password) satisfies the recency threshold, the process may proceed to operation 460.

At operation 430, the process includes rejecting the proposed password and prompting to receive an alternative proposed password during the password reset process. For example, referring to FIG. 1, the character string comparator component 116 may be configured to reject the proposed password 140 for failure to satisfy the recency threshold. In some cases, the character string comparator component 116 may be configured to generate the proposed password rejection(s) 180 which may include the prompt(s) 182 (presented to the user 132) to receive an alternative proposed password during the password reset process. FIG. 4 illustrates that the process may return to operation 410.

At operation 460, the process includes comparing the generated character string to N previous character strings associated with N previous passwords to determine a password similarity metric. For example, referring to FIG. 1, the character string comparator component 116 may query the password data store 118 for the previous character string(s) 170 associated with the user 132. FIG. 1 illustrates that, according to some embodiments, the password data store 118 may store multiple previous passwords (associated with the user 132), each of which may be associated with its own character string (e.g., character strings previously generated by the homomorphic encryption component 114). For example, the passwords may include: the previous password 160 associated with the previous character string 161; the second previous password 162 associated with the second previous character string 163; and one or more other previous passwords, up to the Nth previous password 164 associated with the Nth previous character string 165. The password similarity metric component 120 of the character string comparator component 116 may compare the first character string 150 to each of the previous character string(s) 170 (e.g., the N character strings 161, 163, 165 associated with the N previous passwords 160, 162, 164) to determine a password similarity metric.

At operation 470, the process includes comparing the password similarity metric to a distance threshold. For example, referring to FIG. 1, the distance threshold component 122 of the character string comparator component 116 may compare the password similarity metric generated by the password similarity metric component 120 to a distance threshold.

At operation 472, the process includes determining whether the password similarity metric satisfies at least the distance threshold. Responsive to determining that the password similarity metric does not satisfy the distance threshold, the process proceeds to operation 430. According to some embodiments, responsive to determining that the password similarity metric satisfies the distance threshold, the process may proceed to operation 480.

At operation 430, the process includes rejecting the proposed password and prompting to receive an alternative proposed password during the password reset process. For example, referring to FIG. 1, the character string comparator component 116 may determine that a password similarity metric associated with the first character string 150 (generated by the homomorphic encryption component 114 for the proposed password 140) does not satisfy the distance threshold. Responsive to determining that the password similarity metric associated with the first character string 150 does not satisfy the distance threshold, the character string comparator component 116 may reject the proposed password 140 and generate the proposed password rejection(s) 180. The proposed password rejection(s) 180 may be communicated from the character string comparator component 116 to the password reset user interface component 112. FIG. 1 illustrates that the proposed password rejection(s) 180 presented to the user 132 via the password reset user interface component 112 may include the prompt(s) 182 to receive an alternative proposed password during the password reset process. As another example, referring to FIG. 3A, rejection of the proposed password 140 results in generation of the proposed password rejection(s) 180 that include the prompt(s) 182 to receive an alternative proposed password during the password reset process.

According to some embodiments, at operation 480, the process may include accepting the proposed password during the password reset process and storing the generated character string as a new password. For example, referring to FIG. 1, the character string comparator component 116 may accept the proposed password 140 responsive to determining that the password similarity metric satisfies the distance threshold. The character string comparator component 116 may store the first character string 150 at the password data store 118 as the new password 166 associated with the user 132. As another example, FIG. 2 depicts a scenario in which the character string comparator component 116 has accepted the proposed password 140, and the first character string 150 may be stored at the password data store 118 as the new password 166 associated with the user 132.

Thus, FIG. 4 illustrates an example of a password requirement conformity check process, according to some embodiments. By utilizing homomorphic encryption, the example process depicted in FIG. 4 may enable a robust evaluation of passwords, including an examination of not only a complexity threshold and a recency threshold but also a distance threshold, corresponding to a similarity of a proposed password to one or more previous passwords.

Figure 5:
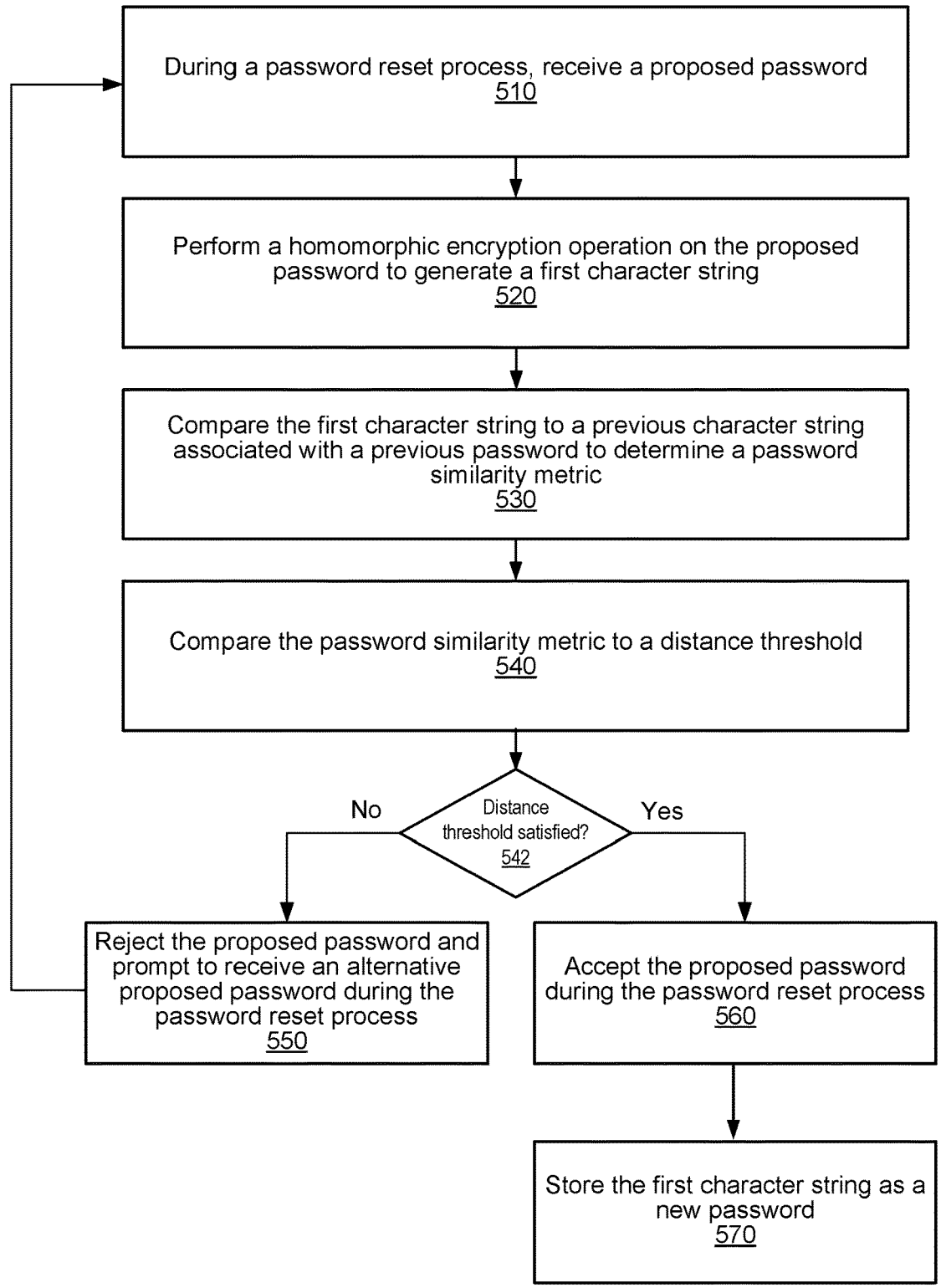
FIG. 5 is a flowchart that illustrates an example of a password requirement conformity check process, according to some embodiments.

FIG. 5 is a flowchart 500 that illustrates an example of a password requirement conformity check process, according to some embodiments. In FIG. 5, one or more hardware processors may be utilized to implement the password requirement conformity check process.

At operation 510, the process includes receiving a proposed password during a password reset process. For example, referring to FIG. 1, the password reset user interface component 112 may receive the proposed password 140 (from the user 132) during a password reset process.

At operation 520, the process includes performing a homomorphic encryption operation on the proposed password to generate a first character string. For example, referring to FIG. 1, the homomorphic encryption component 114 may perform a homomorphic encryption operation on the proposed password 140 to generate a first character string 150.

At operation 530, the process includes comparing the first character string to a previous character string associated with a previous password to determine a password similarity metric. For example, referring to FIG. 1, the character string comparator component 116 may query the password data store 118 for the previous character string(s) 170 associated with the user 132. The password similarity metric component 120 of the character string comparator component 116 may compare the first character string 150 to the previous character string(s) 170 to determine a password similarity metric.

At operation 540, the process includes comparing the password similarity metric to a distance threshold. For example, referring to FIG. 1, the distance threshold component 122 of the character string comparator component 116 may compare the password similarity metric generated by the password similarity metric component 120 to a distance threshold.

At operation 542, the process includes determining whether the password similarity metric satisfies at least the distance threshold. Responsive to determining that the password similarity metric does not satisfy the distance threshold, the process proceeds to operation 550. According to some embodiments, responsive to determining that the password similarity metric satisfies the distance threshold, the process may proceed to operation 560.

At operation 550, the process includes rejecting the proposed password and prompting to receive an alternative proposed password during the password reset process. For example, referring to FIG. 1, the character string comparator component 116 may determine that a password similarity metric associated with the first character string 150 (generated by the homomorphic encryption component 114 for the proposed password 140) does not satisfy the distance threshold. Responsive to determining that the password similarity metric associated with the first character string 150 does not satisfy the distance threshold, the character string comparator component 116 may reject the proposed password 140 and generate the proposed password rejection(s) 180. The proposed password rejection(s) 180 may be communicated from the character string comparator component 116 to the password reset user interface component 112. FIG. 1 illustrates that the proposed password rejection(s) 180 presented to the user 132 via the password reset user interface component 112 may include the prompt(s) 182 to receive an alternative proposed password during the password reset process. As another example, referring to FIG. 3A, rejection of the proposed password 140 results in generation of the proposed password rejection(s) 180 that include the prompt(s) 182 to receive an alternative proposed password during the password reset process.

According to some embodiments, at operation 560, the process may include accepting the proposed password during the password reset process. According to some embodiments, at operation 570, the process may include storing the first character string as a new password. For example, referring to FIG. 1, the character string comparator component 116 may accept the proposed password 140 responsive to determining that the password similarity metric satisfies the distance threshold. The character string comparator component 116 may store the first character string 150 at the password data store 118 as the new password 166 associated with the user 132. As another example, FIG. 2 depicts a scenario in which the character string comparator component 116 has accepted the proposed password 140, and the first character string 150 may be stored at the password data store 118 as the new password 166 associated with the user 132.

Thus, FIG. 5 illustrates an example of a process of a password requirement conformity check process, according to some embodiments. By utilizing homomorphic encryption, the example process depicted in FIG. 5 may enable a robust evaluation of passwords, including an examination of a distance threshold, corresponding to a similarity of a proposed password to one or more previous passwords.

Figure 6:
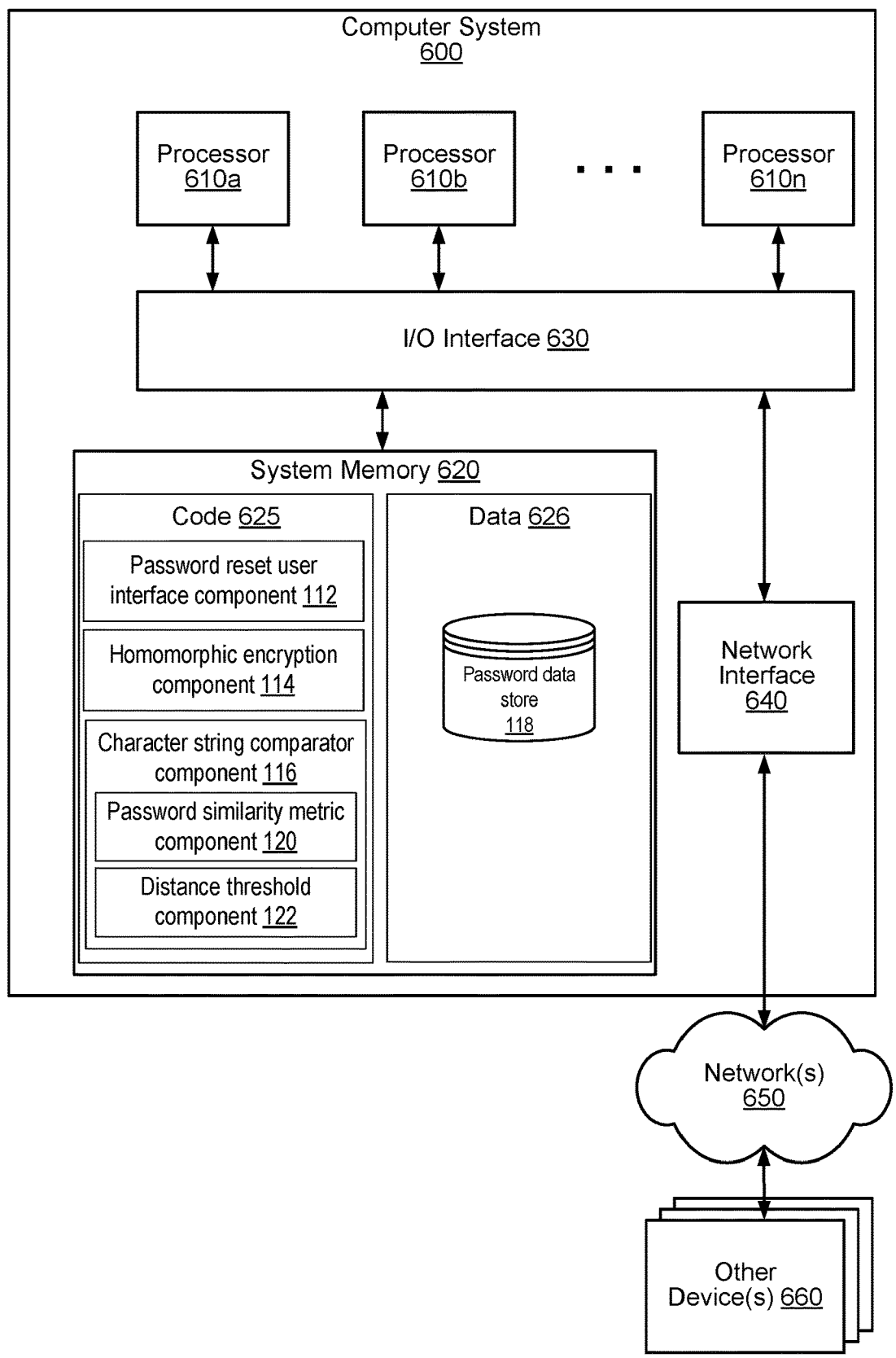
FIG. 6 is a block diagram illustrating an example computer system that may be used to implement one or more portions of a system that implements a password requirement conformity check, according to some embodiments.

FIG. 6 is a block diagram illustrating an example computer system 600 that is used to implement one or more portions of a system that implements a password requirement conformity check, according to some embodiments. For example, the computer system 600 may be a server that implements one or more components of the computing resource(s) 110 depicted in FIG. 1, FIG. 2, and FIGS. 3A-3C.

Computer system 600 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 600 includes one or more processors 610, which may include multiple cores coupled to a system memory 620 via an input/output (I/O) interface 630. Computer system 600 further includes a network interface 640 coupled to I/O interface 630. In some embodiments, computer system 600 may be a uniprocessor system including one processor 610, or a multiprocessor system including several processors 610a-n, as shown. The processors 610 may be any suitable processors capable of executing instructions. For example, in various embodiments, processors 610 may implement one of a number of instruction set architectures (ISAs), such as the x86, PowerPC, SPARC, or MIPS ISA.

As shown, the computer system 600 may also include one or more network communication devices (e.g., network interface 640) for communicating with other systems and/or components over a communications network. For example, an instance of an application executing on computer system 600 may use network interface 640 to communicate with another server application executing on another computer system, as described herein.

As shown, computer system 600 may use its network interface 640 to communicate with one or more other devices 660, such as persistent storage devices and/or one or more I/O devices. In some embodiments, some of these other devices may be implemented locally on the computer system 600, accessible via the I/O interface 630. In various embodiments, persistent storage devices may include disk drives, tape drives, solid state memory, other mass storage devices, or any other persistent storage device. The computer system 600 may store instructions and/or data in persistent storage devices, and retrieve the stored instruction and/or data as needed.

As shown, the computer system 600 may include one or more system memories 620 that store instructions and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 620 may be used to store code 625 or executable instructions to implement the methods and techniques described herein. For example, the executable instructions may include instructions to implement the password requirement conformity check process, as discussed. To illustrate, FIG. 6 depicts an example in which the system memory 620 may be used to store code 625 or executable instructions to implement the password reset user interface component 112, the homomorphic encryption component 114, and the character string comparator component 116, as discussed. Additionally, FIG. 6 illustrates that the code 625 may include the sub-components of the character string comparator component 116, including the password similarity metric component 120 and the distance threshold component 122, as discussed. The system memory 620 may also be used to store data 626 needed or produced by the executable instructions. For example, the in-memory data 626 may include portions of the password data store 118, as discussed.

In some embodiments, some of the code 625 or executable instructions may be persistently stored on the computer system 600 and may have been loaded from external storage media. The persistent storage of the computer system 600 and the external media are examples of non-transitory computer-readable storage media, which may be used to store program instructions to be executed by the computer system 600. A non-transitory computer-readable storage medium may provide the capability to store information in a form readable by a machine (e.g., computer system 600).

Non-transitory computer-readable media may include storage media such as magnetic or optical media, disk or DVD/CD-ROM devices, archival tapes, network-attached storage systems, or other computer systems.

In some embodiments, the I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

In some embodiments, the network interface 640 may allow data to be exchanged between computer system 600 and other devices attached to a network. The network interface 640 may also allow communication between computer system 600 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). In some embodiments, the network interface 640 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
a password management system implemented by a one or more computer systems, configured to:
perform a password conformity check on a first password, including to:
perform a homomorphic encryption operation on the first password to obtain a first character string, wherein the homomorphic encryption operation when performed on two given strings produces two encrypted strings that preserve a distance between the two given strings;
compare the first character string to a previous character string stored in a password data store and generated by the homomorphic encryption operation on a previous password to determine a first password similarity value between the first password and the previous password; and
based on the first password similarity value, reject the first password and request an alternative password;
perform the password conformity check on the alternative password, including to:
perform the homomorphic encryption operation on the alternative password to generate a second character string;
compare the second character string to the previous character string to determine a second password similarity value;
accept the alternative password based on the second password similarity value; and
store the second character string generated from the alternative password in the password data store.

2. The system of claim 1, wherein the password management system is configured to perform the password conformity check as part of a periodic password reset process.

3. The system of claim 1, wherein the first similarity value is a first edit distance between the first character string and the previous character string, and the second similarity value is a second edit distance between the second character string and the previous character string.

4. The system of claim 3, wherein the first edit distance counts a minimum number of edit operations to transform the previous character string into the first character string, wherein the edit operations include one or more character insertions, character deletions, or character replacements.

5. The system of claim 4, wherein the password management system is configured to reject the first password based on an edit distance threshold.

6. The system of claim 5, wherein the password management system is configured receive configuration input to tune the edit distance threshold.

7. The system of claim 1, wherein:
the alternative password is associated with a user account; and
the password management system is configured perform the password conformity check on the alternative password against multiple previous passwords of the user account that satisfy a recency threshold.

8. The system of claim 1, wherein the password conformity check performs a check of the alternative password against a password complexity requirement.

9. The system of claim 1, wherein to reject the first password, the password management system is configured to prevent leakage of information about the previous password through repeated password change attempts.

10. The system of claim 1, wherein the homomorphic encryption operation is performed using an encryption key, and the encryption key is stored separately from the password data store.

11. A method, comprising:
performing, by a password management system implemented by a one or more computer systems:
performing a password conformity check on a first password, including:
performing a homomorphic encryption operation on the first password to obtain a first character string, wherein the homomorphic encryption operation when performed on two given strings produces two encrypted strings that preserve a distance between the two given strings;

comparing the first character string to a previous character string stored in a password data store and generated by the homomorphic encryption operation on a previous password to determine a first password similarity value between the first password and the previous password; and based on the first password similarity value, rejecting the first password and requesting an alternative password;

performing the password conformity check on the alterative password, including:

performing the homomorphic encryption operation on the alternative password to generate a second character string;

comparing the second character string to the previous character string to determine a second password similarity value;

accepting the alternative password based on the second password similarity value; and storing the second character string generated from the alternative password in the password data store.

12. The method of claim 11, wherein the password conformity check is performed as part of a periodic password reset process.

13. The method of claim 11, wherein the first similarity value is a first edit distance between the first character string and the previous character string, and the second similarity value is a second edit distance between the second character string and the previous character string.

14. The method of claim 13, wherein the first edit distance counts a minimum number of edit operations to transform the previous character string into the first character string, wherein the edit operations include one or more character insertions, character deletions, or character replacements.

15. The method of claim 14, wherein the first password is rejected based on an edit distance threshold.

16. The method of claim 15, further comprising the password management system receiving configuration input to tune the edit distance threshold.

17. The method of claim 11, wherein:

the alternative password is associated with a user account; and the password conformity check of the alternative password is performed against multiple previous passwords of the user account that satisfy a recency threshold.

18. The method of claim 11, wherein the password conformity check of the alternative password includes a check of the alternative password against a password complexity requirement.

19. The method of claim 11, wherein the rejecting of the first password prevents leakage of information about the previous password.

20. The method of claim 11, wherein the homomorphic encryption operation is performed using an encryption key, and the encryption key is stored separately from the password data store.

* * * * *